Figure 1:
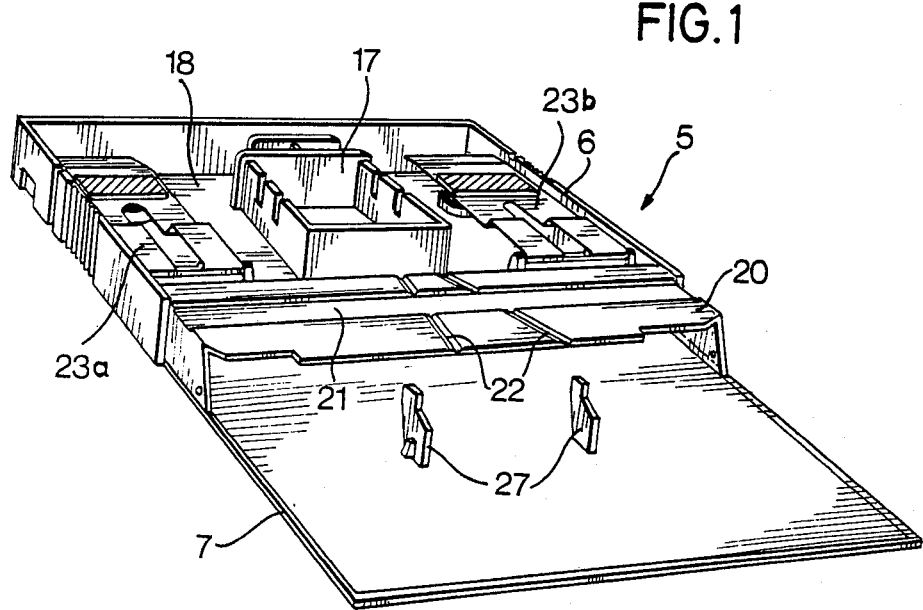

United States Patent [19]

Blankenmeister

[11] 4,271,961

[45] Jun. 9, 1981

[54] BOX FOR TOOLS AND ACCESSORIES FOR TAPE CASSETTES, ESPECIALLY FOR MAGNETIC TAPE CASSETTES

[75] Inventor: Anton Blankenmeister, Boehl-Iggelheim, Fed. Rep. of Germany

[73] Assignee: BASF Aktiengesellschaft, Fed. Rep. of Germany

[21] Appl. No.: 74,142

[22] Filed: Sep. 10, 1979

[30] Foreign Application Priority Data

Sep. 18, 1978 [DE] Fed. Rep. of Germany ... 7827773[U]

[51] Int. Cl.³ ............... B65D 85/00; B65D 77/00; B65D 85/67

[52] U.S. Cl. ................... 206/216; 206/225; 206/373; 206/387

[58] Field of Search ............ 206/387, 455, 225, 53, 206/373, 216

[56] References Cited

U.S. PATENT DOCUMENTS

| | | | |
|---|---|---|---|
| 2,218,256 | 10/1940 | Becht | 206/225 |
| 3,097,558 | 7/1963 | Jacob | 206/225 |
| 3,136,679 | 6/1964 | Bender | 206/455 |
| 3,613,877 | 10/1971 | Sorensen | 206/53 |

OTHER PUBLICATIONS

Instructions For Use of BASF Hobby Box, (for ¼ inch tape).
Instructions For Use of BASF Hobby Box, (for compact cassettes).

*Primary Examiner*—William T. Dixson, Jr.
*Attorney, Agent, or Firm*—Keil & Witherspoon

[57] ABSTRACT

A box of tools and accessories for tape cassettes, especially magnetic tape cassettes, compatible with a filing system for conventional tape cassette filing boxes. The size of the box matches the size of the tape cassette itself or the size, or a multiple of the size, of the cassette filing box. A splicing plate, which is a detachable or non-detachable part of the box, facilitates cutting and splicing of the tape, holding devices for the tape cassette to be processed being arranged at a predetermined distance from the splicing plate.

8 Claims, 6 Drawing Figures

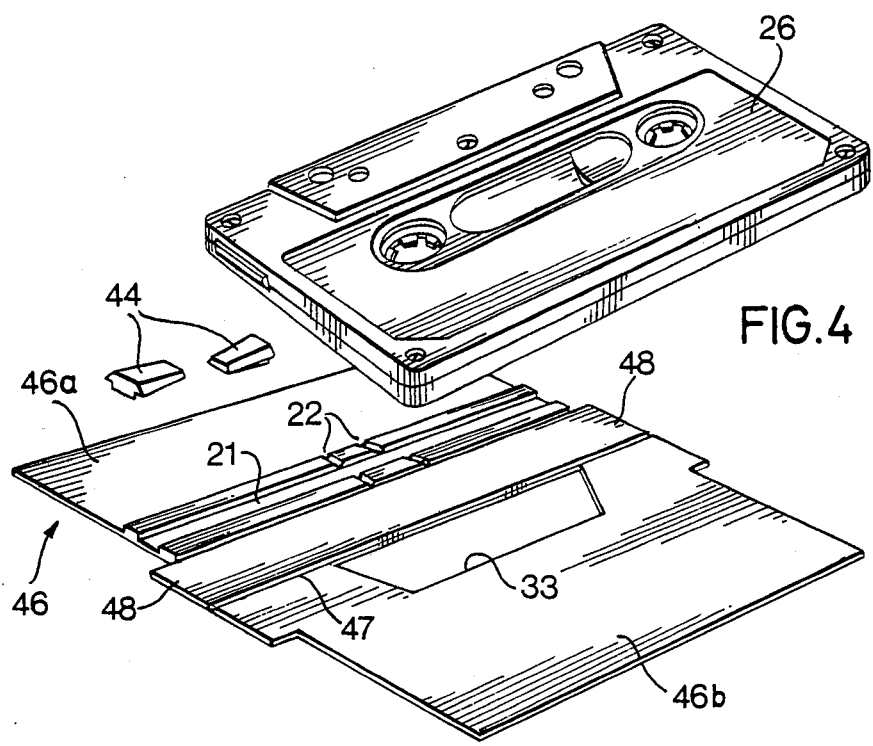

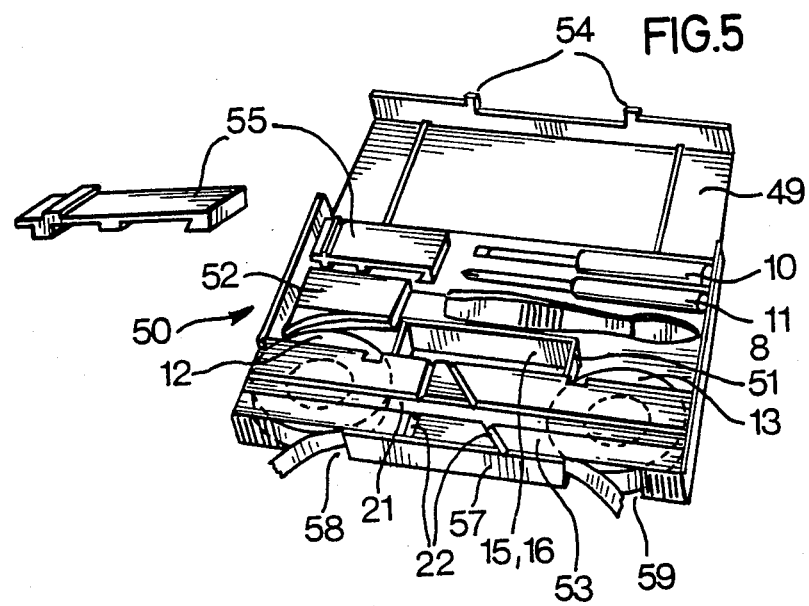
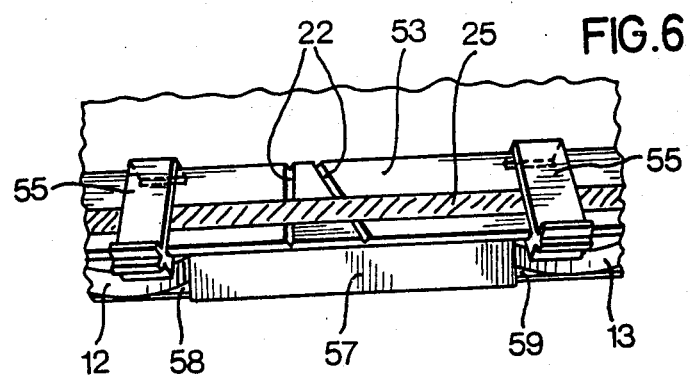

BOX FOR TOOLS AND ACCESSORIES FOR TAPE CASSETTES, ESPECIALLY FOR MAGNETIC TAPE CASSETTES

The present invention relates to a box for tools and accessories for tape cassettes, especially for magnetic tape cassettes, intended for compatibility with a cassette filing system for cassettes in filing boxes, the box being substantially right parallelepipedal in shape and being provided with at least one compartment for tape material, a cutting tool, a splicing plate and small components employed in a tape cassette.

Repair boxes of this type, for normal-width (¼ inch) audio tapes and compact cassettes, are marketed under the name "Hobby-Box" by BASF Aktiengesellschaft, 6700 Ludwigshafen, Germany.

The "Hobby-Box", intended in particular for cutting and splicing ¼ inch audio tapes, has the shape of a rectangular parallelepiped and contains a splicing member as an insert, two clamping springs for the tape which is to be cut and spliced also being pivotally mounted on this splicing member. In addition, the splicing member carries bearing means for rolls of tape material and splicing tape.

The "Hobby-Box" for compact cassettes has a right parallelepipedal shape roughly corresponding to the shape of a conventional cassette storage box, but cannot be filed with such storage boxes and is not convenient to handle, since it has a flat snap-fit lid and its splicing member is a narrow block, about one centimeter high, possessing a groove for receiving the tape, in which the tape is retained without additional clamping or holding devices.

It is an object of the present invention to so improve a box of the type described at the outset that it can be filed in conventional filing systems and that cutting and splicing of cassette tapes can be carried out easily.

We have found that this object is achieved if the box is at least of a size matching that of a tape cassette and can therefore be filed in the filing system, and if it contains a flat splicing plate for the magnetic tape, as well as holding means for the tape cassette to be processed.

An advantageous box shape is thus obtained which enables the box to be filed together with any cassettes which may have to be processed. Furthermore, the invention provides a functional splicing plate, which greatly facilitates the processing, cutting and splicing of thin cassette tapes, particularly because holding means for the cassette to be processed are provided close to the splicing groove, at a fixed distance therefrom.

In a further embodiment of the invention, the box is in the form of a conventional hinged box for unrecorded and pre-recorded compact cassettes. In this box design, the splicing plate is an integral part of the box lid, and holding means for the cassette to be processed are also provided on the lid.

Advantageously, the above box possesses clamping springs, pivotally connected to the bottom portion of the box, which serve as clamping devices for the tape.

In yet another embodiment of the invention, the box according to the invention corresponds in size to two filing boxes stacked one above the other, comprises two parts which are slidably interengaged and an insert, and contains a splicing plate, removable from the box, with holding means for the cassette.

Such a cassette filing box in the form of a drawer is also known. Each box carries connecting elements which enable a plurality of boxes to be stacked together in the manner of a file by pushing the connecting elements into one another.

In this way, a box for tools and accessories for cassettes can be filed together with tape cassette filing boxes, and is immediately at hand for processing a cassette. In this box design, the splicing plate consists of two parts which can be folded together like a hinge, the splicing groove and cutting grooves being provided on one part and the holding means for the cassette to be processed on the other part.

Clamping elements which are designed to press the tape into the splicing groove are provided to prevent the tape from slipping during cutting and splicing.

An advantageous box consists of two parts, namely a bottom part and a lid part, which are pivotally connected together and can be folded together, and which, when folded together, have a size approximately corresponding to that of a tape cassette, a splicing plate removable from the box, and holding means for the tape cassette being provided.

As a result, the tool box itself can be accommodated in a cassette filing box.

Figure 2:
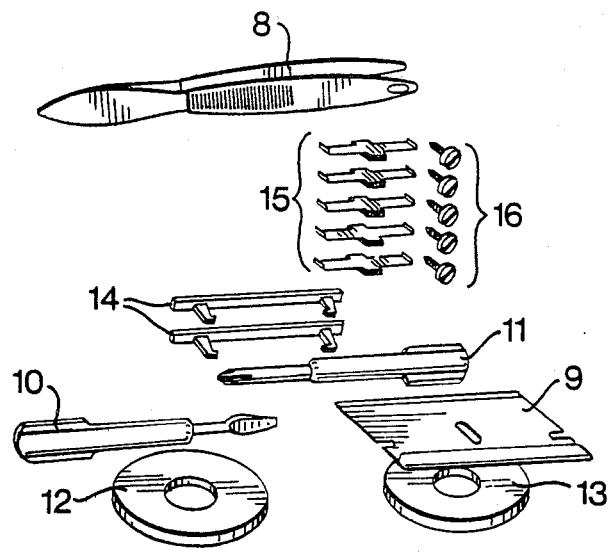
Figure 2:
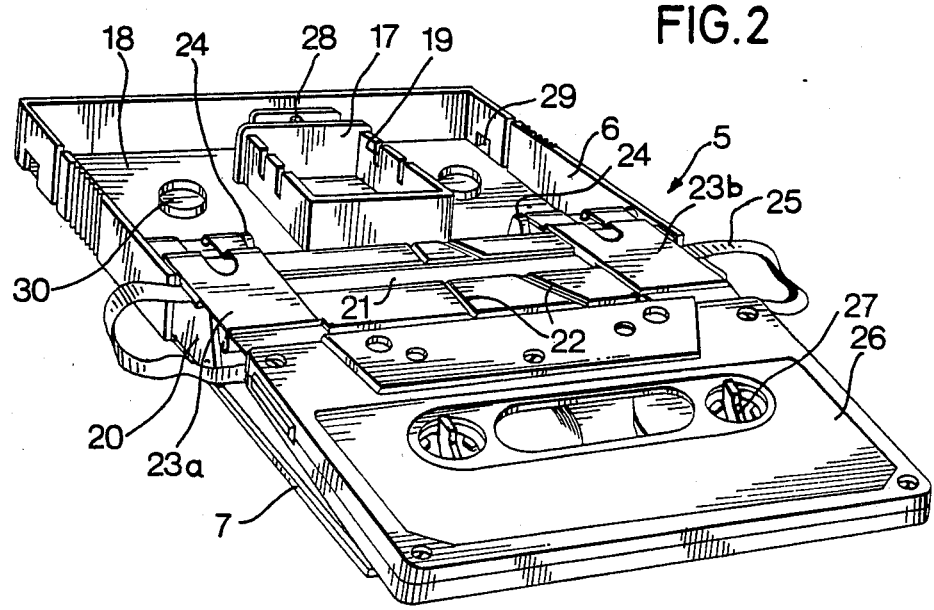
Figure 3:
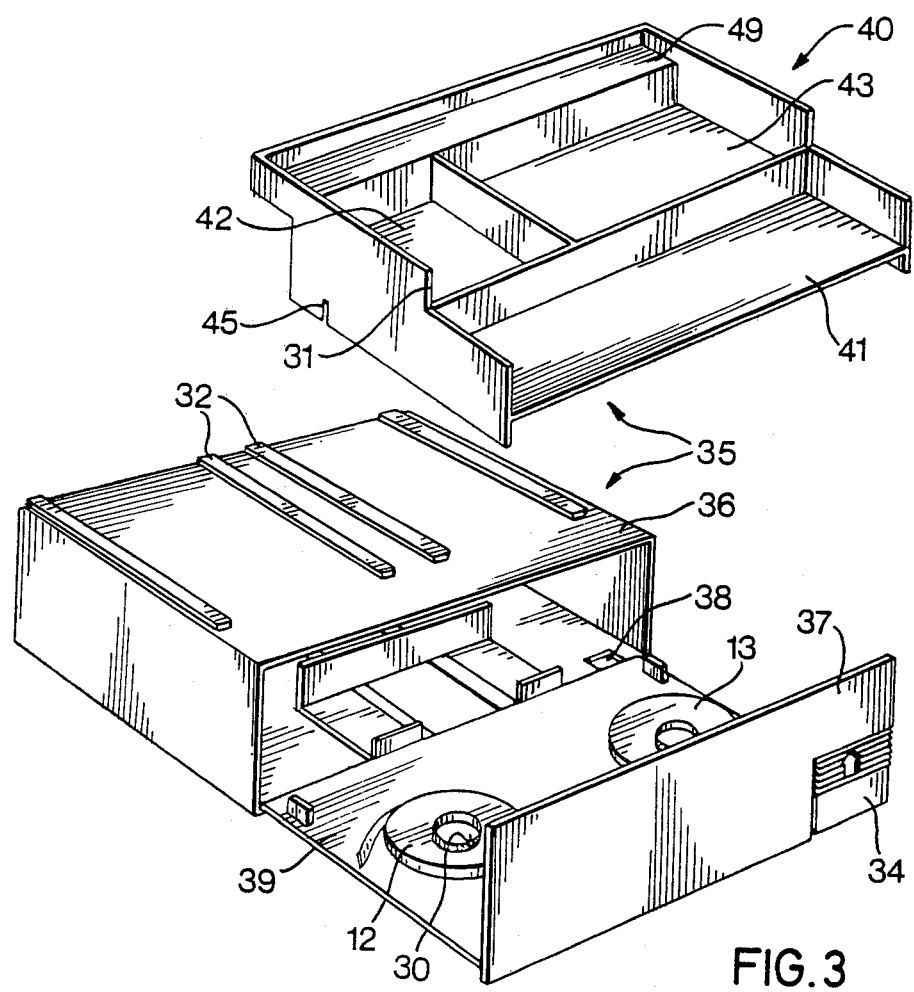

Further details of the invention are disclosed in the following description of the embodiments illustrated in the accompanying drawings, in which FIG. 1 shows an empty box in the form of a hinged box, FIG. 2 shows the box according to FIG. 1, with the tools and accessories, shown in an exploded view, and with a cassette in the position for processing, the tape being clamped in the splicing groove, FIG. 3 shows a further box in the form of a drawer, in an exploded view, without the splicing plate, FIG. 4 shows a splicing plate belonging to the box of FIG. 3, with a cassette about to be placed thereon, and with clamping elements for a tape to be processed, FIG. 5 shows a further embodiment of the box, having the size of a compact cassette, and FIG. 6 shows a portion of the box of FIG. 5, with a magnetic tape clamped on the splicing plate.

The hinged box 5 of FIG. 1 consists of a bottom part 6 and a lid part 7 pivotally attached thereto, the parts being shown in the opened position. The bottom part 6 has compartments 17, 18 for receiving the tools and accessories shown in FIG. 2, specifically tweezers 8, a cutter blade 9, two screw drivers 10 and 11, two rolls of tape 12 and 13, one being a roll of adhesive tape and the other, for example, a roll of leader tape, two clamping elements 14, pressure springs 15 and screws 16. Of the compartments, the compartment 17, which is arranged approximately centrally, and which receives the small components 15 and 16, additionally has slots 19 for holding the tweezers 8. A web-like support 28 between the compartment 17 and the front wall of the bottom part 6, and apertures 29 serve to hold the screw drivers 10 and 11. The tape rolls 12 and 13, placed on circular bearing collars 30, and the cutter blade 9 and clamping elements 14 are accommodated in the second, larger compartment 18.

The splicing plate forms part of a pouch 20. It consists essentially of a straight groove 21 of rectangular cross-section, and 90° and 45° blade-guiding grooves 22. It is possible to injection-mold the grooves 21 and 22 integrally with the lid, so that the additional expense is slight. Clamping springs 23a and 23b are located at the beginning and end of the splicing groove 21, and are pivotally mounted on blocks 24 in the bottom part 6.

The tape to be processed, or the tape ends 25, is/are inserted in the groove 21, clamped by means of the springs 23a and 23b, cut and then spliced by means of a piece of the adhesive tape either to a length of leader tape or to the other end of the tape.

During this processing of the tape, the cassette 26 is advantageously immovably held by the holding means, in this case projections 27, on the inside of the lid 7, so that the necessary manipulations such as turning the rolls of magnetic tape, drawing out the magnetic tape, opening the cassette and the like can be carried out easily.

FIGS. 3 and 4 show another box, 35, by way of example. In this embodiment, identical parts bear the same reference numerals as in FIGS. 1 and 2.

The box 35 consists of a drawer-type container of twice the volume of a commercial drawer-type filing box for a compact cassette. A drawer 37, connected to a hollow right parallelepipedal body 36 by spring means, not shown, can be pushed into the said body. A catch 34 on the front wall, together with an opening 38 in the body 36, serves to lock and to release the parts 36 and 37. The tape rolls 12 and 13 are rotatably mounted on circular bearing collars 30 on the horizontal part 39 of the drawer 37. It is therefore easy, as is also the case with the embodiment shown in FIGS. 1 and 2, to pull tape off the tape rolls 12 and 13 whilst they are in position on the bearing collars 30 and draw this tape to the cutting groove. An insert 40 advantageously possesses a tape withdrawal slot 45, so that the insert 40 can remain on the drawer 37 whilst the magnetic tape is being processed. The insert 40 which fits into the body and has compartments for receiving the individual components 8-11 and 14-16 shown in FIG. 2, can be placed on the part 39, above the tape rolls 12 and 13. Whilst a front compartment 41 is intended to accommodate tweezers 8, cutter blade 9 and screw drivers 10 and 11, compartments 42 and 43 serve to receive the small parts 14-16 and clamping members 44 which will be described later. A compartment 49 serves as support surface for a splicing plate 46. This separate splicing plate 46, shown in FIG. 4, is so designed that it can be folded together about a film hinge 47 and, when placed on the insert 40, also serves to cover the upper compartments 41 and 43. The grooves 21 and 22 are provided on one part, 46a, of the plate 46, whilst the other part, 46b, is provided with holding means for the cassette 26 which is to be processed. In the present case, the holding means are advantageously in the form of an aperture 33 which matches the shape of the raised portion of the cassette. When the tape, or the tape ends, has/have been introduced into the groove 21, they can be clamped therein by means of the separate clamping members 44. Of course it is also possible to use flat clamping elements on the part of the plate which carries the grooves 21 and 22, these clamping elements being hingedly mounted, and therefore pivotable, similarly to those shown in FIGS. 1 and 2. Lateral projections 48 are advantageously provided in the central part of splicing plate 46, which projections serve to hold the splicing plate in position on insert 40, the said projections cooperating with cutaway portions 31 in the side walls of the insert 40. Dovetail ribs 32 on the top wall of body 36 and matching grooves in the bottom wall enable the box to be interconnected with other cassette storage boxes of the same type.

In contrast to the box embodiments described above, which have a size equal to, or twice, that of a storage box for compact cassettes, FIG. 5 shows a compact box 50 of approximately the same size as a compact cassette. The box 50 has a flat hinged lid 49, on the edge of which are provided projections 54 for holding the cassette to be processed. The screw drivers 10 and 11 are again present, as are tweezers 8 and rolls of adhesive tape and leader tape, 12 and 13. One compartment, 51, again serves to receive the small components 15 and 16. The knife, 52, is of a different shape to the rectangular cutter blade 9.

A splicing plate 53 is arranged on the inside near the front of the box, and may be detachable or nondetachable, depending on what is expedient. In the position shown, the plate 53 should in any case be fixedly retained to prevent it slipping. In the embodiment shown, the splicing groove 21 corresponds to those in FIGS. 2 and 4. The blade-guiding grooves 22 can also be arranged exactly as before, or in any other suitable position. As is shown in FIG. 6, the magnetic tape 25 is fixed, before cutting, in the groove 21 by means of clamping members 55 which extend across the plate 53 and possess projections 56 for pressing the tape 25 into the groove 21. With the tape 25 fixed as shown in FIG. 6, the cut can be made without any risk of the tape slipping. In this working position of the splicing plate 53, the plate also serves as the top cover for the space for the rolls of adhesive tape and leader tape 12 and 13. Apertures 58 and 59 for directly withdrawing the required pieces of tape are provided in the front wall 57 of the box 50.

Materials which can be used for such boxes are the conventional plastics employed for the manufacture of tape cassettes, which plastics are usually injection-molded.

The boxes described have been tested in the field, and the arrangement of the tools and accessories, etc. and the handling were given a favorable assessment. From an economic point of view, the box according to the invention is also more advantageous than prior art embodiments.

The present invention is not restricted to the embodiments described above; rather, various modifications will occur to those skilled in the art, for which protection is also claimed.

I claim:

1. A box for tools and accessories for tape cassettes, especially for magnetic tape cassettes, intended for compatibility with a cassette filing system for cassettes in filing boxes, the box being substantially right parallel-epipedal in shape and being provided with at least one compartment for tape material, a cutting tool and a splicing member, and small components employed in a tape cassette, wherein the box is at least of a size matching that of a tape cassette and can therefore be filed in the filing system, and contains as splicing member a splicing plate for the magnetic tape, as well as holding means for the tape cassette to be processed.

2. A box as claimed in claim 1, which is of the same external dimensions as a filing box and consists of two parts which are pivoted relative to one another and fit into one another in the closed condition of the box, the bottom part being a right parallelepipedal part, open on one side, and the lid part being provided with a pouch but otherwise being flat, the splicing groove and cutting grooves being provided in the outer surface of the pouch and the holding means being provided on the inner surface of the lid.

3. A box as claimed in claim 2, wherein clamping means are provided which clamp the tape in the splicing groove.

4. A box as claimed in claim 3, wherein the clamping devices are clamping springs pivotally mounted on the bottom part.

5. A box as claimed in claim 1, which box corresponds in size to two filing boxes stacked one above the other, comprises two parts which are slidably interengaged, and an insert, and contains a splicing plate, removable from the box, with holding means to positively locate a tape cassette on the plate.

6. A box as claimed in claim 5, wherein the splicing plate consists of two parts which can be folded together like a hinge, the splicing groove and cutting grooves being provided on one part and the holding means on the other part.

7. A box as claimed in claim 5 or 6, wherein clamping members are provided which are designed to press the tape into the splicing groove.

8. A box as claimed in claim 1, which box consists of two parts, namely a bottom part and a lid part, which are hingedly connected together and can be folded together, which parts, when folded together, have a size corresponding substantially to the size of a tape cassette and fit into a filing box, the box containing a splicing plate removable from the box, and holding means for a tape cassette.

* * * * *

UNITED STATES PATENT AND TRADEMARK OFFICE
CERTIFICATE OF CORRECTION

PATENT NO. : 4,271,961
DATED : June 9, 1981
INVENTOR(S) : Anton Blankenmeister

It is certified that error appears in the above—identified patent and that said Letters Patent is hereby corrected as shown below:

In the first line of the Abstract, "A box of tools" should read --A box for tools--.

Signed and Sealed this

Tenth Day of November 1981

[SEAL]

*Attest:*

GERALD J. MOSSINGHOFF

*Attesting Officer*     *Commissioner of Patents and Trademarks*